United States Patent

Gobbi et al.

[11] Patent Number: 5,775,640
[45] Date of Patent: Jul. 7, 1998

[54] LANDING INSTALLATION FOR LANDING A TETHERED BALLOON

[76] Inventors: Matthieu Gobbi, 71 avenue Raymond Poincaré; Jérôme Giacomoni, 91 avenue Kléber, both of 75116 Paris, France

[21] Appl. No.: 663,074
[22] PCT Filed: Dec. 19, 1994
[86] PCT No.: PCT/FR94/01488
  § 371 Date: Jun. 19, 1996
  § 102(e) Date: Jun. 19, 1996
[87] PCT Pub. No.: WO95/17333
  PCT Pub. Date: Jun. 29, 1995

[30] Foreign Application Priority Data

Dec. 22, 1993 [FR] France .............. 93 15709

[51] Int. Cl.$^6$ .................................. B64B 1/66
[52] U.S. Cl. .................. 244/115; 244/115; 244/33
[58] Field of Search .............. 244/115, 33, 161, 244/116

[56] References Cited

U.S. PATENT DOCUMENTS

| 803,573 | 11/1905 | Eubank | 244/33 |
| 1,396,489 | 11/1921 | Williams | 244/33 |
| 1,829,503 | 10/1931 | Carlotti | 244/115 |
| 4,126,850 | 11/1978 | Randolph | 340/28 |
| 4,762,295 | 8/1988 | Yon, Jr. | 244/115 |

FOREIGN PATENT DOCUMENTS 424364  3/1910  France .............. 244/115

Primary Examiner—Robert J. Oberleitner
Assistant Examiner—Tien Dinh
Attorney, Agent, or Firm—Ladas & Parry

[57] ABSTRACT

An installation for landing a tethered balloon comprises a balloon which is brought back down towards the ground (9) by means (11) of a return cable (2), and which has a gondola (6) which is hollow in its center to allow the return cable (2) to pass therethrough, and it also includes means for winding the return cable (2) out and in, which means are mounted in a cavity (10) in the ground. According to the invention, the installation also includes a landing platform (3) covering the cavity (10) and including an opening (12) through which the return cable (2) passes, which opening is centered on the vertical outlet axis (12a) of the return cable (2). The landing platform (3) comprises the curved surface (3a, 3b) of at least one right truncated cone (13, 14) which is extended at its bottom by a substantially horizontal annular landing zone (15, 15') and which is centered on the vertical outlet axis (12a) of the return cable (2); the gondola (6) of the balloon (1) is fitted with at least three swivel-mounted wheels which are fixed beneath the gondola (6) in an annular zone of the same size as the landing zone (15, 15').

14 Claims, 4 Drawing Sheets

LANDING INSTALLATION FOR LANDING A TETHERED BALLOON

The present invention relates to a landing installation for landing a tethered balloon which is brought back to the ground by means of a return cable. It relates more particularly to an installation for enabling the gondola of a tethered balloon to be landed on a landing platform in a position where it is centered relative to the vertical outlet axis of the return cable.

In the present text, the term "balloon" designates a gas balloon constituted by a gastight envelope which contains a gas that is less dense than air and which, more particularly, is suitable for being held captive in a net; the net is also secured to a load frame, from which the gondola is suspended. The gondola enables passengers to embark on board the balloon.

A tethered balloon is a balloon connected to the ground. In a first known type of tethered balloon, the balloon is designed so as to be capable of being in equilibrium with the atmosphere at all times and it is connected to the ground by means of return cords. The function of the return cords is solely to oppose the drift effects of the wind by retaining the balloon in a space situated above a clear landing zone on the ground lying between attachment points for the return cords. Under such circumstances, the balloon rises in the air and returns to the ground with its own means; the gondola of the balloon lands within the landing zone wherever it is taken by the wind.

In a second known type of tethered balloon, the balloon is designed so that it always tends to rise in the air. Under such circumstances, it is brought down to the ground by means of a return cable that passes through the center of the gondola and that has one end connected to the load frame. The other end of the return cable is wound onto a winch system which is mounted in a depression in the ground. The sole purpose of the depression is to house the winch system. With this second type of tethered balloon, the gondola never lands on the ground, but remains suspended a few meters above the winch depression; passengers embark in the gondola by means of a gangway.

It will readily be understood that with a tethered balloon of the second type, it is difficult, and indeed dangerous, for the passengers to embark on board the gondola because of the great instability of the gondola, particularly in the presence of wind. In order to mitigate that drawback, a first object of the present invention is to propose an installation enabling the gondola of a tethered balloon of the second type to be landed on a landing platform on the ground.

When a tethered balloon of the second type is moving up or down, the balloon is observed to be deflected slightly because of the wind, so the return cable is no longer vertical. Consequently, assuming that it is desired to land the gondola of a tethered balloon of the second type on a landing platform that covers the depression containing the winch system, when the tethered balloon is brought back to the ground, the gondola reaches the platform off-center relative to the vertical outlet axis of the return cable. If the platform is plane, then the tethered balloon lands and remains in its off-center position. It should be observed that throughout the descent of the balloon, the gondola remains in a substantially horizontal position. If no special precautions are taken to recenter the gondola, it can happen that movements of the balloon, under the effect of wind and in particular when the wind direction reverses, put the suspension lines connecting the gondola to the load frame back under tension, thereby entraining the gondola. Such unwanted movements of the gondola when placed on the landing platform are prejudicial to proper embarkation or disembarkation of passengers who run the risk of being injured.

A second object of the present invention is therefore to propose a landing installation for a tethered balloon of the second type that enables the gondola of the tethered balloon to be landed in a position that is centered relative to the vertical outlet axis of the return cable.

These various objects are fully achieved by the landing installation of the invention for landing a tethered balloon, which installation, in conventional manner, comprises both a balloon which is brought down to the ground by means of a return cable, with the gondola of the balloon having a hollow center through which the return cable passes, and means for winding the return cable out and in, which means are mounted in a cavity in the ground.

In a manner characteristic of the invention, the landing installation further comprises a landing platform covering the cavity and including an opening through which the return cable passes and which is centered on the vertical outlet axis of the return cable; the landing platform consists in the curved surface of at least one right truncated cone which is extended at its bottom by a substantially horizontal annular landing zone and which is centered on the vertical outlet axis of the return cable; the gondola of the tethered balloon is fitted with at least three swivel-mounted wheels which are fixed beneath the gondola in an annular zone having the same dimensions as the landing zone.

In the installation of the invention, gondola landing can be subdivided into three successive stages. During the first two stages the suspension lines connecting the gondola to the load frame are always tensioned, and the gondola is continuously suspended from the load frame which is pulled down towards the ground by the return cable. In the first stage, the gondola arrives over the landing platform in a position that is substantially horizontal, but off-center relative to the vertical outlet axis of the return cable; none of the wheels of the gondola is yet in contact with the platform. In the second stage, at least one of the swivel-mounted wheels of the gondola comes into contact with the curved surface of a truncated cone; the gondola continues to move downwards under the combined effects of traction from the return cable and of gravity, being guided by the swivel-mounted wheel on the surface of the truncated cone towards the landing zone situated further down, until all of the swivel-mounted wheels of the gondola come into contact with the landing zone. At the end of this second stage, the gondola is in a position that is centered relative to the vertical outlet axis of the cable. In a third stage, the return cable continues to be wound in so as to relax all of the suspension lines connecting the gondola to the load frame. The balloon can then move under the effect of the wind without putting the suspension lines under tension. The gondola is held securely stationary on the landing zone.

In a first particular embodiment, the curved surface of the landing platform corresponds to the inside surface of a downwardly-directed hollow right truncated cone.

In a second particular embodiment, the curved surface of the landing platform corresponds to the outside surface of an upwardly-directed right truncated cone; in which case the recess in the gondola for passing the return cable must also be large enough to enable the gondola to receive said truncated cone during the second stage of landing.

In a preferred embodiment, combining the two particular embodiments given above, the two truncated cones are concentric; the outside curved surface of the upwardly-directed truncated cone, referred to as the "inner" truncated cone, and the inside curved surface of the downwardly-directed truncated cone, referred to as the "outer" truncated cone, are interconnected by a single annular landing zone.

Advantageously, in this preferred embodiment, when the inner and outer truncated cones have the same angle at the apex, the gondola is fitted with at least two pairs of swivel-mounted wheels which are fixed beneath the gondola around a circle, the diameter of the circle being equal to the inter-cone distance, with the two wheels in each pair being diametrically opposite. The term "inter-cone" distance is used herein to mean the maximum distance in a horizontal plane between the curved surfaces of the two truncated cones. Thus, during the second stage of landing, when two diametrically opposite wheels are in contact with the landing platform and in alignment with the vertical outlet axis of the return cable, one of them comes into contact with the curved surface of one of the two truncated cones, e.g. the outer truncated cone, while the other comes into contact with the curved surface of the other truncated cone, e.g. the inner truncated cone. The gondola is thus held accurately horizontal, by the surfaces of the two truncated cones and by said two wheels which are situated in the same horizontal plane, and it continues moving down towards the landing zone while remaining in said position. Recentering of the tethered balloon during the second stage of landing is performed with very great stability for the gondola.

More particularly, in order for recentering of the tethered balloon to be accurate, and for the wheels of the gondola to be locked in position by the inside and outside curved surfaces of the outer and inner truncated cones when the gondola is placed on the landing zone, said surfaces intersect at a circle which corresponds to the landing zone. In which case, the inter-cone distance corresponds to the diameter of the circle.

In order to obtain optimum distribution of the weight of the gondola over all of the swivel-mounted wheels, the base of the gondola is a regular polygon having n vertices, and it is fitted with n swivel-mounted wheels which are fixed on the diagonals of the polygon. The swivel-mounted wheels are preferably fixed on the inscribed circle of the polygon, which polygon is an octagon.

Other characteristics and advantages of the invention appear from the following description of a preferred embodiment of an installation of the invention for landing a tethered balloon, which installation is given by way of non-limiting example and is described with reference to the accompanying drawings, in which.

Figure 1:
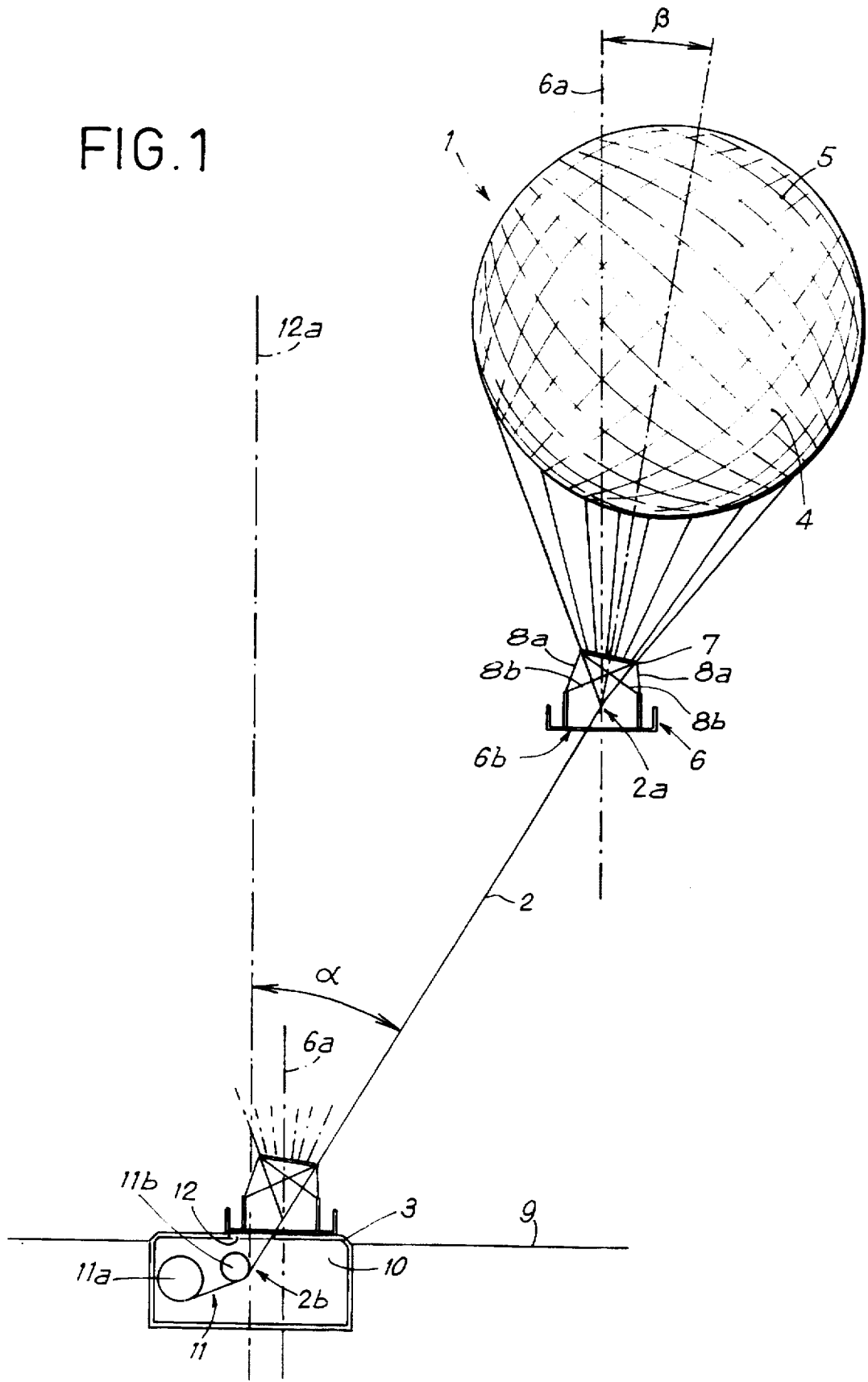
FIG. 1 is a diagram of an installation for landing a tethered balloon and including a plane landing platform.

With reference to FIG. 1, a presently known type of tethered balloon comprises a balloon 1 which can be brought back down to the ground 9 by means of a return cable 2. The balloon 1 comprises a gastight envelope 4 which is held captive in a net 5, and also a gondola 6 which is suspended from a load frame 7 secured to the net 5. In practice, the gastight envelope 4 contains helium and a ballonet of air under pressure so that the balloon 1 is always subjected to an upwardly directed force, also referred to as "lift", and always tends to move up through the air by its own means. The gondola 6 is connected to the load frame 7 by means of short suspension lines 8a and crossed lines 8b referred to as "bracing" lines. The gondola 6 is a body of revolution about a central axis of symmetry 6a and has a hollow center so as to pass the return cable 2 regardless of the angle of inclination that may be taken up by said cable. A cavity 10 is also formed in the ground 9 to serve as a housing for a winch system 11 comprising a main drum 11a that is rotated plus a deflection pulley 11b. A first end 2a of the return cable 2 passes through the bottom 6b of the gondola 6 and is fixed symmetrically around the entire periphery of the load frame 7. The other end 2b is wound onto the main drum 11a after passing over the deflection pulley 11b. The term "vertical outlet axis" of the return cable 2 is used in the present text to designate the vertical axis 12a that is tangential to the periphery of the deflection pulley 11b and that consequently corresponds to the vertical position which the return cable 2 is capable of taking up.

At present, during the operations of disembarking and of embarking passengers on board the gondola 6, a tethered balloon as described above is not designed to be brought right down onto the ground, but it remains suspended in the air, a few meters above the cavity 10. One way of enabling the balloon 1 to land on the ground 9 would be to cover the cavity 10 with a plane platform 3 as shown in FIG. 1. Under such circumstances, the platform 3 must necessarily include an opening 12 allowing the return cable 2 to pass therethrough and which is centered on the vertical outlet axis 12a. However, that solution suffers drawbacks as described below.

When the gondola 6 rests on the platform 3 and the return cable 2 is wound out, the balloon 1 rises into the air by its own means. To bring it back down to the ground, the cable 2 is wound in onto the main drum 11a of the winch. While the tethered balloon is moving up and down, the gondola 6 remains suspended from the load frame 7 via at least the short suspension lines 8a which remain constantly under tension. In the absence of any wind, the cable 2 is vertical and coincides with its own vertical outlet axis 12a. The load frame 7 remains horizontal and the bracing lines 8b remain relaxed so long as the angle between the bottom 6b of the gondola and the horizontal remains smaller than an angle of about 8°. When this angle runs the risk of exceeding 8°, e.g. due to the gondola 6 being unbalanced by a bad distribution of passengers, then the bracing lines 8b come under tension and prevent said inclination of the bottom 6b of the gondola 6 exceeding 8° relative to the horizontal. In the presence of wind, the gastight envelope 4 of the tethered balloon 1 is subjected to considerable lateral thrust forces which serve firstly to incline the return cable 2 at an angle a relative to its vertical outlet axis 12a, and secondly to tilt the assembly comprising the gastight envelope 4 and the load frame 7 through an angle β relative to the vertical axis of symmetry 6a of the gondola 6. The gondola remains horizontal so long as the angle of inclination β is less than or equal to 8°, which corresponds to an angle of inclination α of about 30°. When the inclination of the load frame 7 exceeds 8°, the bracing lines 8b come under tension and the gondola is entrained by the load frame 7. As a result, the bracing lines 8b cause the bottom 6b of the gondola 6 to remain continuously substantially horizontal, thereby ensuring the comfort of passengers on board the gondola 6.

In the presence of wind, when the tethered balloon 1 is brought back down to the ground by winding in the return cable 2, the gondola 6 lands on the platform 3 in a position that is off-center relative to the vertical outlet axis 12a of the return cable 2, as shown in FIG. 1. The offset between the axis of symmetry of the gondola 6 and the vertical outlet axis 12a of the return cable 2 is a function of the angle α. The size of the platform 3 must therefore be designed as a function of the size of the gondola 6, and the maximum values for the angle α and the suspension lines 8a.

In the absence of wind, when the gondola 6 is placed on the landing platform 3, and the return cable 2a has been sufficiently wound in onto the main drum 11a, the suspension lines 8a and 8b are relaxed. In the presence of wind, the gastight envelope 4 and the load frame 7 are deflected relative to the vertical. If the gondola 6 is centered relative to the vertical outlet axis 12a of the return cable 2, then the deflection cannot give rise to the suspension lines 8a being put under tension so the gondola 6 remains entirely stationary on the platform 3. In contrast, if the gondola 6 is in an off-center position relative to the vertical outlet axis 12a, it can happen that the suspension lines 8a which are up-wind are brought back under tension by the deflection of the load frame 7, thereby lifting the gondola 6 relative to the platform 3.

The landing installation of the invention, a preferred embodiment of which is described below, provides an improvement to the installation of FIG. 1 in that the gondola 6 of the tethered balloon is fitted with swivel-mounted wheels and the landing platform 3 has a special profile enabling the gondola 6 to be recentered relative to the vertical outlet axis 12a of the return cable 2 during landing. This prevents any risk of untimely movement of the gondola under the effect of wind, once the gondola has been placed on the landing platform.

Figure 2:
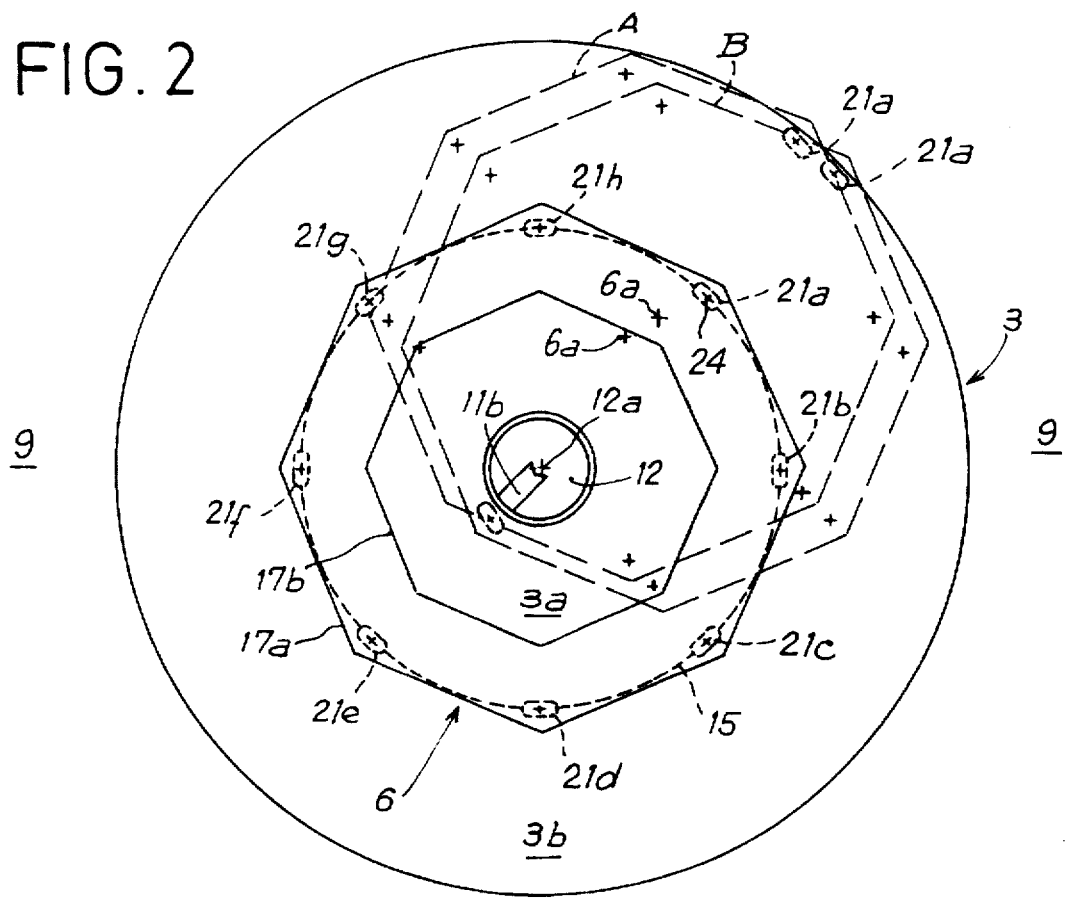
FIG. 2 is a simplified plan view of the landing platform and the octagonal gondola of the tethered balloon in a landing installation of the invention.
Figure 4:
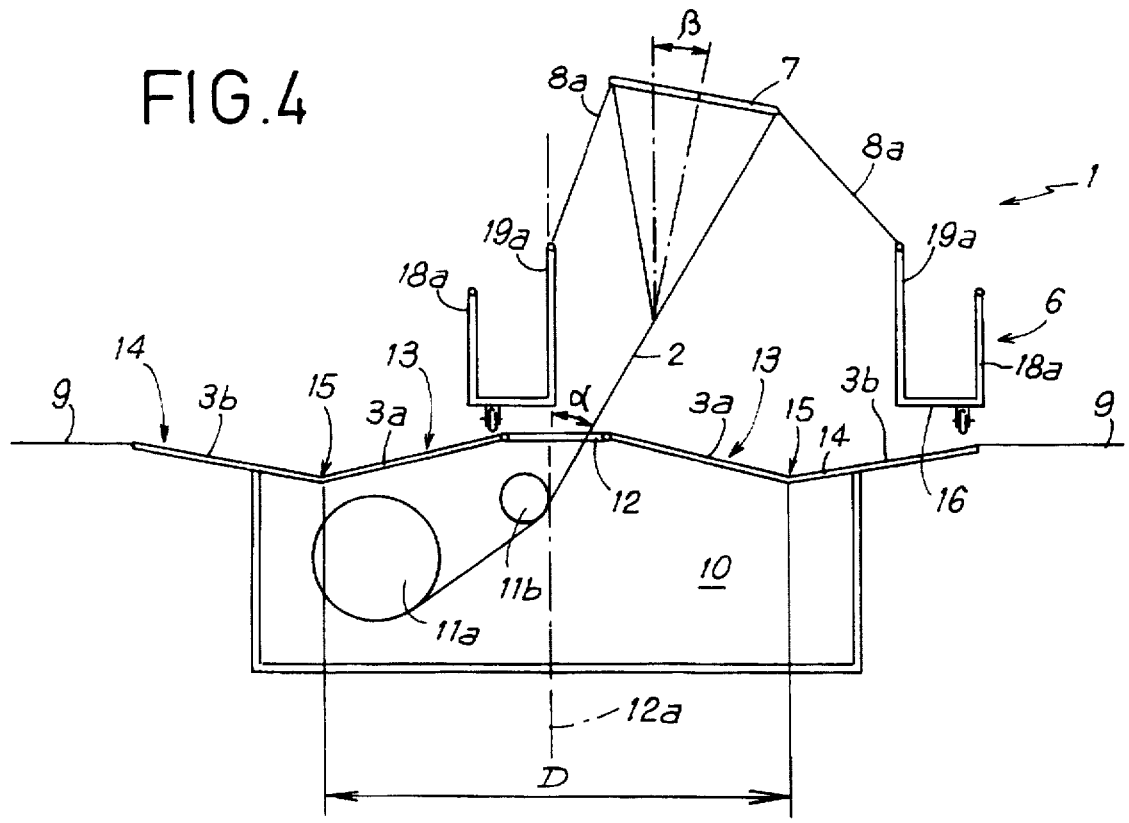
FIG. 4 is a section view of the landing platform and of the gondola in the landing installation of the invention when the gondola is in its final approach stage to the landing platform.

With reference to FIGS. 2 and 4, the platform 3 of the invention is not plane but is constituted by the outside curved surface 3a of an inner truncated cone 13 and by the inside curved surface 3b of an outer truncated cone 14 which is hollow. These truncated cones 13 and 14 are truncated right cones centered on the vertical outlet axis 12a of the return cable 2. They are concentric and they have the same angle at the apex, however they are opposite ways round, the inner truncated cone 13 being upwardly directly while the outer truncated cone 14 is downwardly directed. The curved surfaces 3a and 3b intersect and where they intersect they define a circular landing zone 15 of diameter D below the outlet opening 12 of the return cable 2.

Figure 3:
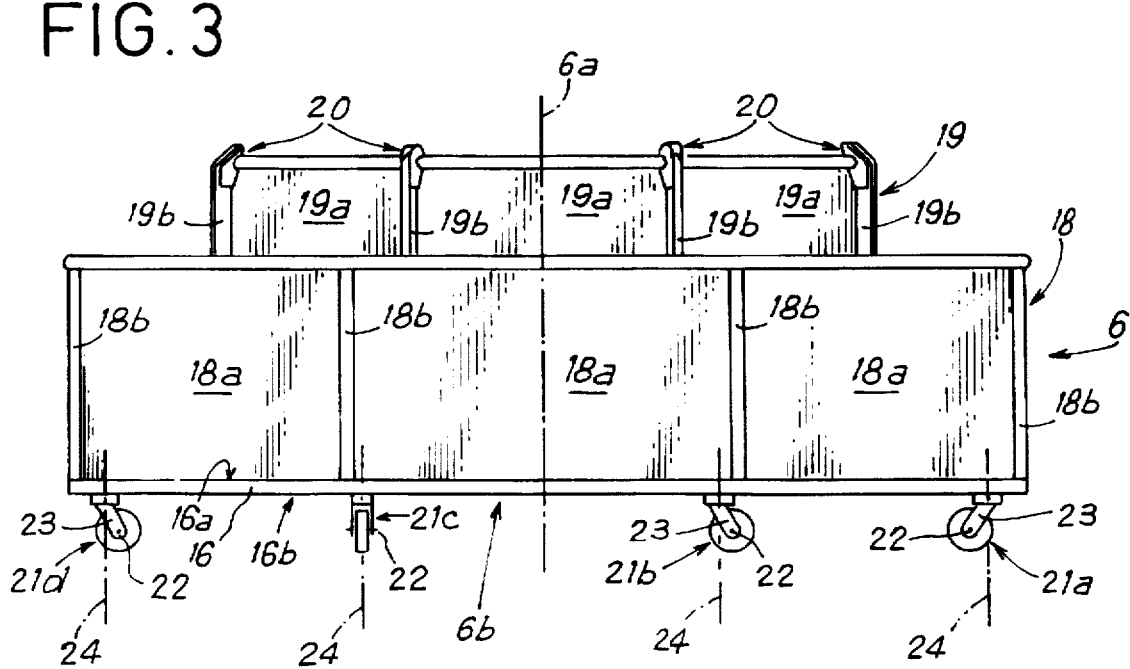
FIG. 3 is a side view of the FIG. 2 gondola.

With reference to FIGS. 2 and 3, the bottom 6b of the gondola 6 of the tethered balloon 1 in a landing installation of the invention consists in a bottom plate 16 having a hollow center and whose outside and inside perimeters 17a and 17b form two concentric octagons. On the top face 16a of the bottom plate 16, there is secured an outside metal frame 18 of octagonal shape, and on which eight vertical plates 18a are fixed so that each plate 18a extends one of the sides of the octagonal outside perimeter 17a vertically from the bottom plate 16. Similarly, an octagonal inside metal frame 19 receives eight vertical plates 19a and is mounted on the inside perimeter 17b of the bottom plate 16. The vertical uprights 19b of the inside metal frame 19 are taller than the vertical uprights 18b of the outside metal frame 18; their top ends 20 are designed to be fixed to one of the ends of the suspension lines 8a, there being one suspension line 8a per vertical upright 19b, with the opposite end of each suspension line 8a being fixed to the periphery of the load frame 7.

The gondola 6 is also fitted with eight wheels 21a, 21b, 21c, 21d, 21e, 21f, 21g, and 21h. Each wheel is mounted to rotate freely about a horizontal axis 22 relative to a support 23 in the form of an upside-down U-shape. Each support 23 is swivel-mounted on the bottom face 16b of the bottom plate 16 about a vertical swivel axis 24. As a result, the horizontal axis of rotation 22 of each wheel can take up any direction. The supports 23 for the wheels 21a to 21h are also fixed to the bottom face 16b of the octagonally-shaped bottom plate 16 in such a manner that the vertical swivel axes 24 thereof lie simultaneously on the diagonals of the plate 16 and on a circle which is centered on the central axis of symmetry 6a of the bottom plate 16, with the diameter of the circle being equal to the diameter D of the landing zone 15. In the particular embodiment shown in FIG. 2, the bottom plate 16 is so dimensioned relative to the two truncated cones 13 and 14 that said circle corresponds to the circle inscribed within the outside perimeter 17a of the bottom plate 16, thereby making it possible to obtain very good stability for the gondola on the ground.

In FIG. 4, the tethered balloon 1 is in its final stage of approaching the platform 3 in the presence of wind. The gondola 6 is therefore off-center relative to the vertical outlet axis 12a of the return cable 2. None of the wheels of the gondola 6 is yet in contact with one of the curved surfaces 3a or 3b of the truncated cones 13 and 14. The gondola 6 is suspended from the load frame 7, with all of its suspension lines 8a being under tension. The bottom plate 16 of the gondola 6 lies in a substantially horizontal plane.

When traction continues to be applied to the return cable 2, at least a first wheel of the gondola 6 comes into contact with one of the two curved surfaces 3a and 3b of the two truncated cones 13 and 14. Since the bottom plate 16 of the gondola is still substantially horizontal, this contact takes place either close to the ground 9 for the curved surface 3b of the outer truncated cone 14, or else close to the outlet opening 12 of the return cable 2 on the curved surface 3a of the inner truncated cone 13.

In FIG. 2, dashed lines show two positions referenced A and B that may be taken up, by way of example, by the outside perimeter 17b of the bottom plate 16 of the gondola 6 at the moment it comes into contact with the landing platform 3. When the gondola 6 arrives off-center relative to the outlet vertical axis 12 of the return cable 2, and in the particular position given reference A, only the wheel 21a comes into contact with the curved surface 3b of the outer truncated cone 14, in the immediate proximity of the ground 9. Because of the lift of the balloon 1, the wheel 21a can swivel about its vertical swivel axis 24, and it can take up a position defined by the slope of the curved surface 3b. The gondola 6 which remains suspended from the load frame 7 continues to move downwards under the effect of gravity and above all of traction in the return cable 2 on the load frame 7 until it reaches the lower circular landing zone 15, being directed over the surface of the outer truncated cone 14 by the swivel-mounted wheel 21a. During this downward movement of the gondola 6, the inner truncated cone 3 penetrates into the bottom plate 16. It is then up to the person skilled in the art to dimension the recess in the bottom plate 16 of the gondola 6 as a function of the size of the inner truncated cone 6, and more particularly of its angle at the apex, and as a function of the height of the swivel-mounted wheels of the gondola, so that the inner truncated cone 13 can be received in the bottom of the gondola 6 without coming directly into contact with the bottom plate 16 of the gondola 6. In practice, the constraint that applies to the size of the hollow in the gondola 6 for passing the return cable 2 when it takes up its maximum inclination of 30° relative to the vertical is always large enough for the inner truncated cone 13 to be capable of penetrating into the gondola 6. It should also be observed that it is not possible for one of the wheels of the gondola 6 to be caught in the outlet opening 12 of the return cable 2 that is formed through the apex of the inner truncated cone 13. Consequently, the inner truncated cone 13 serves to protect the winch system 11, and more particularly the deflection pulley 11b.

In the position referenced B, the two diametrically opposite wheels 21a and 21e are in alignment with the vertical outlet axis 12a of the return cable 2. Since the bottom plate 16 of the gondola 6 is substantially horizontal, and since the distance between the two diametrically opposite wheels 21a and 21e is equal to the diameter D of the circular zone 15, both of these two wheels 21a and 21e come into contact with the platform 3. The wheel 21a is in contact with the curved surface 3b of the outer truncated cone 14 in the immediate proximity of the ground 9. The wheel 21e is in contact with the curved surface 3a of the inner truncated cone 13 in the immediate proximity of the outlet opening 12 of the return cable 2. In this case, both of the wheels 21a and 21e swivel so as to line up with the slope of the curved surface of the corresponding truncated cone and the gondola 6 continues to move downwards until it reaches the circular landing zone 15, being radially guided by the two wheels 21a and 21e on the surfaces of the inner and outer truncated cones 13 and 14.

Naturally the two characteristic landing positions described above with reference to FIG. 2 are not the only positions that can be taken up by the gondola 6 at the moment of landing. For example, it is possible for the gondola 6 to come into contact with the curved surface of one of the two truncated cones of the landing platform via two adjacent wheels, or via a plurality of pairs of diametrically opposite wheels.

Figure 5:
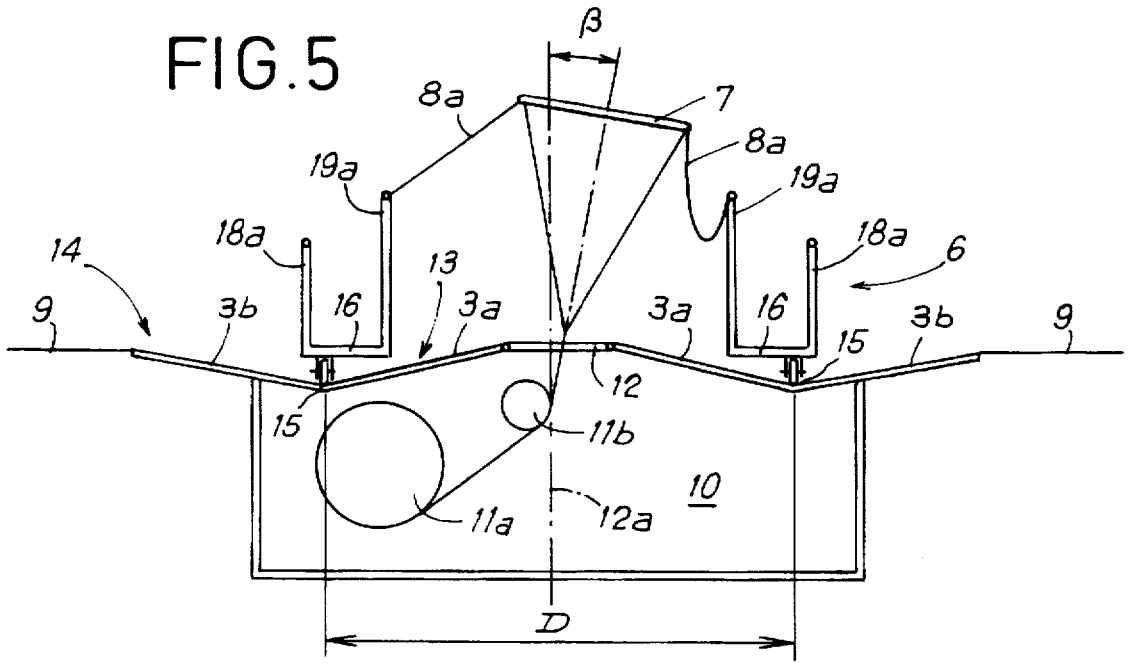
FIG. 5 is a second view of the landing platform and of the gondola of the landing installation of the invention when the gondola is placed on the landing zone, below the outlet opening of the return cable.

When the gondola 6 reaches the circular landing zone 15, all of its swivel-mounted wheels 21a to 21h come into contact with the landing zone 15. The gondola is then accurately recentered relative to the vertical outlet axis 12a of the return cable 2. This is the position shown in FIG. 5. Thereafter the return cable 2 continues to be wound in until all of the suspension lines 8a are completely relaxed. Thus, when the gondola is in this centered position, with all of the suspension lines 8a being kept slack by traction on the return cable 2, even if the load frame 7 were to be inclined at a maximum angle β relative to the vertical, the suspension lines 8a cannot be put back under tension. As a result the gondola 6 remains perfectly stationary in the circular landing zone 15.

In a particular embodiment, the angles at the apex between the axes of symmetry of the truncated cones 13 and 14 and their respective surfaces 3a and 3b was equal to 77°. The diameter D of the circular landing zone was 5.36 meters. The distance between two diametrically opposite vertices of the outside perimeter 17a of the bottom plate 16 was 5.8 meters. The distance between two diametrically opposite vertices of the octagonal inside perimeter 17b of the bottom plate 16 of the gondola 6 was 3.96 meters.

Figure 6:
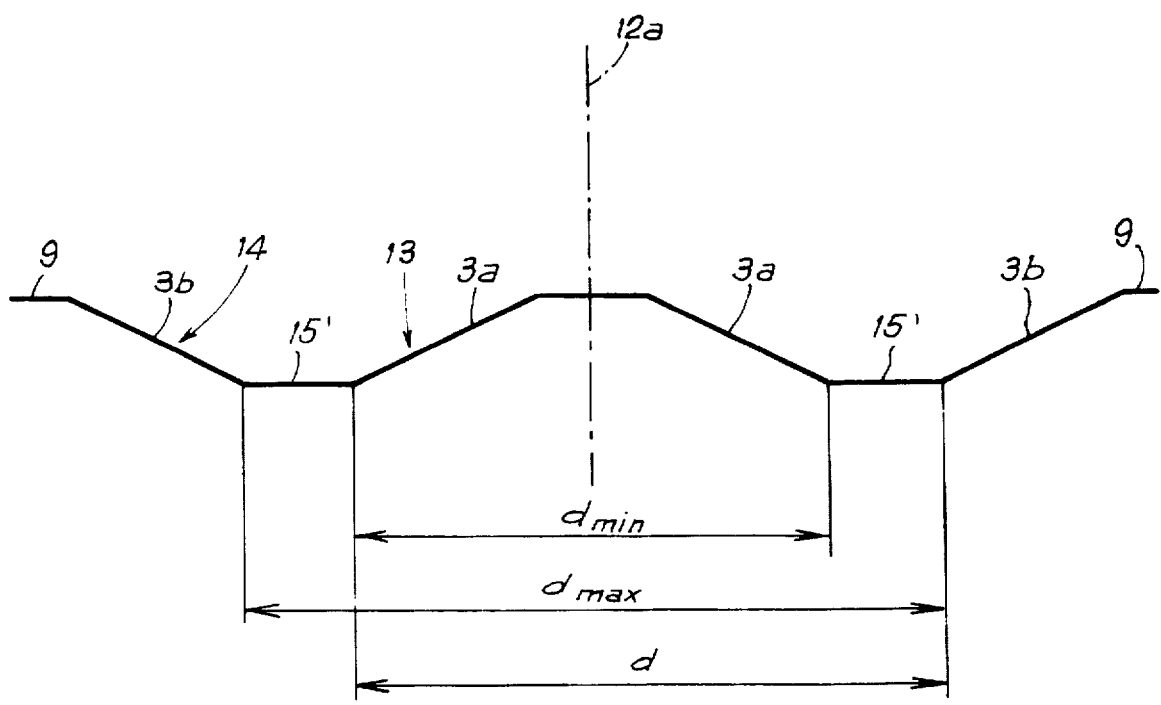
FIG. 6 is a diagram showing another possible profile for the landing platform of an installation of the invention.

The invention is not limited to the preferred embodiment described above. It would be possible to design a landing platform with an inner truncated cone 13 only, the outer truncated cone 17 being replaced, for example, by a horizontal annular landing zone. Conversely, it would also be possible to design a platform 3 with an outer truncated cone 14 only, the inner truncated cone 13 being replaced by a horizontal annular landing zone. It is also possible within the ambit of the invention to design a landing platform in which the curved surfaces of the inner and outer truncated cones 13 and 14 do not intersect but are interconnected by a horizontal annular landing zone 15', as shown in the profile of FIG. 6. In this case, the distance between two diametrically opposite wheels of the gondola 6, e.g. between the wheels referenced 21a and 21e should be selected to lie between the minimum diameter $d_{min}$ and the maximum diameter $d_{max}$ of the annular landing zone 15'. This distance is preferably selected to be equal to the inter-cone distance d which corresponds to the maximum distance in a horizontal plane between the curved surfaces of the inner and outer truncated cones 13 and 14. It should be observed that this inter-cone distance d corresponds to the diameter D of the circular landing zone 15 when the curved surfaces 3a and 3b of the two truncated cones 13 and 14 intersect.

Each bottom plate 16 of the gondola 6 may be any regular polygon. The bottom plate 16 may also be in the form of a ring.

We claim:

1. A tethered balloon and landing installation therefor, the tethered balloon being brought back towards the ground by means of a return cable, and including a gondola which has a hollow center through which the return cable passes, and the installation including means for winding out and in the return cable, which means are mounted in a cavity in the ground, the balloon and installation being characterized in that the installation further comprises a landing platform covering the cavity and including an opening through which the return cable passes and which is centered on a vertical outlet axis for the return cable, in that firstly the landing platform is constituted by the curved surface of at least one right truncated cone which is extended at its bottom by a substantially horizontal annular landing zone and which is centered on the vertical outlet axis for the return cable, and in that, secondly, the gondola of the balloon is fitted with at least three swivel-mounted wheels which are fixed beneath the gondola in an annular zone having the same dimensions as the landing zone.

2. A tethered balloon and landing installation thereof according to claim 1, characterized in that the curved surface for the landing platform corresponds to the inside surface of a downwardly directed hollow right truncated cone.

3. A tethered balloon and landing installation thereof according to claim 1, characterized in that the curved surface of the landing platform corresponds to the outside surface of an upwardly directed right truncated cone, and in that the recess in the gondola for passing the return cable is large enough to enable the gondola to have said truncated cone pass therethrough.

4. A tethered balloon and landing installation therefor according to claim 1, wherein the curved surface of the landing platform comprises two truncated cones, and an annular landing zone interconnecting said two truncated cones, an wherein an inner cone of said cones is upwardly directed, whereas an outer of said cones is downwardly directed.

5. A tethered balloon and landing installation therefor according to claim 4, characterized in that the outside and inside curved surfaces of the two inner and outer truncated cones intersect at a circle which corresponds to the landing zone.

6. A tethered balloon and landing installation therefor according to claim 5, characterized in that the base of the gondola is a regular polygon having n vertices, and is fitted with n swivel-mounted wheels which are fixed on the diagonals of the polygon.

7. A tethered balloon and landing installation therefor according to claim 6, characterized in that the swivel-mounted wheels are fixed on the inscribed circle of the polygon.

8. A tethered balloon and landing installation therefor according to claim 4, characterized in that the base of the gondola is an octagon.

9. A tethered balloon and landing installation therefor according to claim 4 wherein the inner and outer truncated cones have the same angle at the apex, the gondola is fitted with at least two pairs of swivel-mounted wheels which are fixed beneath the gondola around a circle, the diameter of the circle being equal to the inter-cone distance with the two wheels in a pair being diametrically opposite.

10. A tethered balloon and landing installation therefor according to claim 9, characterized in that the base of the gondola is a regular polygon having n vertices, and is fitted with n swivel-mounted wheels which are fixed on the diagonals of the polygon.

11. A tethered balloon and landing installation therefor according to claim 9, characterized in that the outside and inside curved surfaces of the two inner and outer truncated cones intersect at a circle which corresponds to the landing zone.

12. A tethered balloon and landing installation therefor according to claim 11, characterized in that the base of the gondola is a regular polygon having n vertices, and is fitted with n swivel-mounted wheels which are fixed on the diagonals of the polygon.

13. A tethered balloon and landing installation therefor according to claim 12, characterized in that the swivel-mounted wheels are fixed on the inscribed circle of the polygon.

14. A tethered balloon and landing installation therefor according to claim 9, characterized in that the base of the gondola is an octagon.

* * * * *